United States Patent [19]
Lueh et al.

[11] Patent Number: 6,158,048
[45] Date of Patent: Dec. 5, 2000

[54] METHOD FOR ELIMINATING COMMON SUBEXPRESSIONS FROM JAVA BYTE CODES

[75] Inventors: Guei-Yuan Lueh; Ali-Reza Adl-Tabatabai, both of Santa Clara, Calif.

[73] Assignee: Intel Corporation, Santa Clara, Calif.

[21] Appl. No.: 09/087,349

[22] Filed: May 29, 1998

[51] Int. Cl.[7] ...................................................... G06F 9/45
[52] U.S. Cl. .................................................................. 717/9
[58] Field of Search .................................. 395/709; 717/9

[56] References Cited

U.S. PATENT DOCUMENTS

| | | |
|---|---|---|
| 4,642,764 | 2/1987 | Auslander et al. ........................... 717/9 |
| 4,656,583 | 4/1987 | Auslander et al. ........................... 717/9 |
| 5,367,685 | 11/1994 | Gosling ........................................ 717/9 |
| 5,396,631 | 3/1995 | Hayashi et al. .............................. 717/7 |
| 5,481,708 | 1/1996 | Kukol .......................................... 717/9 |
| 5,535,391 | 7/1996 | Hejlsberg et al. ........................... 717/9 |
| 5,644,709 | 7/1997 | Austin ....................................... 714/53 |
| 5,668,999 | 9/1997 | Gosling ........................................ 717/4 |
| 5,713,010 | 1/1998 | Buzbee et al. ........................... 345/507 |
| 5,790,867 | 8/1998 | Schmidt et al. ............................. 717/9 |
| 6,002,879 | 12/1999 | Radigan et al. ......................... 707/527 |

OTHER PUBLICATIONS

Deodhar, R.; "Optimizing Compiler Technology Streamlines Complex Systems", Electronic Design, vol. 45, Iss 9, pp. 153, May 1997.

Cramer et al.; "Compiling Just In Time", IEEE Micro, vol. 17, Iss 3, pp. 36–43, May 1997.

Pollock et al.; "Incremental Global Reoptimization of Programs". ACM Transactions on Programming Languages and Systems, vol. 14, No. 2, pp. 173–200, Apr. 1992.

Lambright, H.D.; "Java Bytecode Optimizations". Proceedings of the 1997 COMPCON, pp. 206–210, Feb. 1997.

Gupta et al.; "Magic–sets Transformation in Nonrecursive Systems". Proceedings of the eleventh ACM SIGACT–SIGMOD–SIGART symposium on Principles of database systems, pp. 354, Jun. 1992.

Bacon et al.; "Compiler Transformations for High–Performance Computing", ACM Digital Library[online]. ACM Computing Surveys, vol. 26, No. 4, Dec. 1994.

(List continued on next page.)

*Primary Examiner*—Tariq R. Hafiz
*Assistant Examiner*—Kelvin E. Booker
*Attorney, Agent, or Firm*—Blakely, Sokoloff, Taylor & Zafman LLP

[57] ABSTRACT

Compilers are tools that generate efficient mappings from programs to machines. A Java "Just-In-Time" runs as part of an application, and as such, it must be fast and efficient in its use of memory. To achieve good performance and further optimize code generation, the present invention introduces a method for eliminating common subexpressions from Java bytecodes. The method of the present invention first loads a code stream containing sequences of computer code into computer memory. The expression value for a first expression of a first code sequence is computed and stored in a memory location. A tag is assigned to the memory location holding this expression value for tracking which expression sequences' values are held in memory locations. As code compilation continues, the code selector looks ahead in the code stream to see if any upcoming expression sequences already have expression values stored in a memory location. The code selector compares the expression of a second code sequence with the code sequences annotated by the tags of expression values currently stored in memory. If the second code sequence matches a sequence already associated with a memory location, then the value of the matched sequence is pushed from the memory location onto a stack, and the computations of the expression of the second code sequence is skipped. If the second expression does not match any of the expressions represented by the tags, the expression value of the second expression is calculated and stored in a memory location. This memory location is then annotated with its own expression tag for future comparisons with upcoming expressions in the code stream.

29 Claims, 5 Drawing Sheets

OTHER PUBLICATIONS

Tyma, P.; "Tuning Java Performance". Dr. Dobb's Journal, vol. 21, No. 4, pp. 52–58, Apr. 1996.

Cierniak et al.; "Briki: an optimizing Java compiler", IEEE/IEE Electronic Library [online]. Proceedings of IEEE Compcon '97, pp. 179–184, Feb. 1997.

Bell, D.; "Make Java fast: Optimize!", JavaWorld[online]. Acessed from internet on Jun. 22, 1999. Retrieved from:<http:/www.javaworld.com> Apr. 1997.

Hsieh et al.; "Compilers for improved Java Performance", IEEE/IEE Electronic Library [online]. Computer, vol. 30, Iss. 6, pp. 67–75, Jun. 1997.

Armstrong, E.; "HotSpot: A new breed of virtual machine", Javaworld [online]. Accessed on Jun. 22, 1999. Retrieved from:<http://www.javaworld.com>Mar. 1998.

Jensen et al.; "Security and Dynamic Class Loading in Java: a Formalisation". IEEE/IEE Electronic Library [online], May 1998.

Aho et al.; Compilers, Principles, Techniques, and Tools. Addison–Wesley Publishing Company, Reading, MA. Chapters 9 and 10, Dec. 1985.

Lindholm et al.; The Java Virtual Machine Specification. Addison–Wesley Publishing Company, Reading, MA. Chapters 2–4, Sep. 1996.

James Gosling, et al., The Java Language Specification, Published by Addison–Wesley, 1996, pp. 29–49, Sep. 1996.

Tim Lindholm, et al., The Java Virtual Machine Specification, Published by Addison–Wesley, 1997, pp. 57–82, Sep. 1996.

Alfred V. Aho, et al., Compilers–Principles, Techniques, and Tools, Published by Addison–Wesley, 1988, pp. 1–24, Sep. 1985.

Steven S. Muchnick, Advanced Compiler Design & Implementation, Published by Morgan Kaufmann, 1997, pp. 1–18, 319–328 and pp. 377–396, Aug. 1997.

Douglas Kramer, The Java Platform–A White Paper, Published by Javasoft, 1996, pp. 6–24, May 1996.

| 510 | 520<br>Native Code | 530<br>eax | 540<br>ecx | 550<br>edx |
|---|---|---|---|---|
| 583: aload_0 | | | | |
| 584: getfield #34 | | | | |
| 587: getfield #45 | mov ecx, [ebp_o4h] | --- | [583,4] | --- |
| 590: getfield #44 | mov edx, [ecx+190h] | --- | [583, 4] | [583, 7] |
| 593: lload 18 | | | | |
| 595: l2i | | | | |
| 596: aaload | mov eax, [edx+18h]<br>mov ecx, [esp+128h]<br>cmp [eax+04h], ecx<br>jbe_throw | [583, 10]<br>[583, 10] | [583, 4]<br>[593, 3] | [583, 7]<br>[583, 7] |
| 597: getfield #16 | mov edx, [eax+ecx*4+08h] | [583, 10] | [593, 3] | [583, 14] |
| 600: l2i | | | | |
| 601: istore5 | mov eax, [edx+04h]<br>mov [esp+160h], eax | [583, 10] | [593, 3] | [583, 14] |
| 603: aload_0 | | | | |
| 604: getfield #34 | | | | |
| 607: getfield #45 | | | | |
| 610: getfield #44 | | | | |
| 613: lload 18 | | | | |
| 615: l2i | | | | |
| 616: aaload | | | | |
| 617: getfield #49 | | | | |
| 620: i2l | mov ecx, [edx+0Ch]<br>mov edx, ecx<br>sar edx, 1Fh | | | |
| 621: lstore 20 | mov [esp+124h], edx<br>mov [esp+120h], ecx | | | |

FIG. 5

METHOD FOR ELIMINATING COMMON SUBEXPRESSIONS FROM JAVA BYTE CODES

BACKGROUND OF THE INVENTION

1. Field of the Invention

This invention relates to the field of computer software optimization. More particularly, the present invention relates to a method for eliminating common subexpressions in computer code.

2. History of the Prior Art

Computer programs are generally created as source code. The source code is compiled into object code for execution on a specific processor. Hence, most programs exist as compiled object code in computer systems. The compiled object code is usually designed/compiled to operate on only one particular operating system and/or on only one particular computer processor architecture. In order to use a certain program on several different computer systems, the original source code must be compiled into object code for each different operating system and each different processor architecture.

The popularization of the World Wide Web has exacerbated a problem for software developers trying to create software for networked consumer devices. While millions of people around the globe are surfing the Internet and browsing web pages with their computers, not all of those computers are the same. One person may be using a Macintosh, another a PC, and yet another user with a UNIX machine. Hence computer programs need to be designed to support multiple host architectures and to allow secure delivery of its software components. As a result, Sun Microsystems Inc., developed Java. Java is a general purpose, concurrent object oriented programming language that supports a highly portable programming environment. Java was designed such that its code could survive transport access networks and operate on any client, while assuring the client that the program was safe to run.

A Java program is created by compiling source code written in Java's well defined source code format into a compact, architecture-neural object code known as Java bytecodes. Compilation normally consisting of translating Java source code into a machine independent bytecode representation. Bytecodes are executed at runtime by an interpreter residing on the client computer. Runtime activities may include loading and linking the classes needed to execute a program, native machine code generation and dynamic optimization of the program, and actual program execution.

Java bytecodes are designed to operate on a Java Virtual Machine (VM). The Java Virtual Machine is an abstract computing machine that has its own instruction set and uses various memory areas. A Java VM is not an actual hardware platform, but rather a low level software emulator that can be implemented on many different processor architectures and under many different operating systems. The Java VM reads and interprets each bytecode so that the instructions may be executed by the native microprocessor. Hence compiled Java bytecodes are capable of functioning on any platform that has a Java Virtual Machine implementation available. However, bytecode interpretation detracts from processor performance since the microprocessor has to spend part of its processing time interpreting bytecodes. Java "Just-In-Time" (JIT) compilers were introduced to improve the performance of Java Virtual Machines. A Java JIT compiler translates Java bytecodes into the processor's native machine code during runtime. The processor then executes the compiled native processor object code like any other native program. Such compiled Java programs execute much faster than Java programs that are executed using a Java interpreter.

Although a Just-In-Time compiled Java program executes faster than an interpreted Java program, the performance of such Just-In-Time compiled Java programs can be further improved. Since Just-In-Time compilations must be performed very quickly to provide an immediate response to the user, Just-In-Time compiled code is usually not very well optimized. The importance of compilation speed in a Java JIT compiler creates the additional requirement that optimization algorithms be lightweight and effective.

SUMMARY OF THE INVENTION

The present invention introduces a method for eliminating common subexpressions from Java bytecodes. The method of the present invention first loads a code stream containing sequences of computer code into computer memory. The expression value for a first expression of a first code sequence is computed and stored in a memory location. A tag is assigned to the memory location holding this expression value for tracking which expression sequences' value are held in memory locations. As code compilation continues, the code selector looks ahead in the code stream to see if any coming expression sequences already have expression values stored in a memory location. The code selector compares an expression of a second code sequence with the code sequences annotated by the tags of expression values currently stored in memory. If the second code sequence matches a sequence already associated with a memory location, then the expression value of the matched sequence is pushed from the memory location onto a stack, and the expression of the second code sequence is skipped in the code stream. If the second expression does not match any of the expressions represented by the tags, the expressions value of the second expression is calculated and stored in a memory location. This memory location is then annotated with its own expression tag for future comparisons with upcoming expressions in the code stream.

Other objects, features, and advantages of the present invention will be apparent from the accompanying drawings and from the detailed description that follows.

BRIEF DESCRIPTION OF THE DRAWINGS

The present invention is illustrated by way of example and not limitations in the figures of the accompanying drawings in which like references indicate similar elements, and in which:

FIG. 5 shows the optimization of example source code by one embodiment of the present invention.

DETAILED DESCRIPTION OF THE INVENTION

Figure 1:
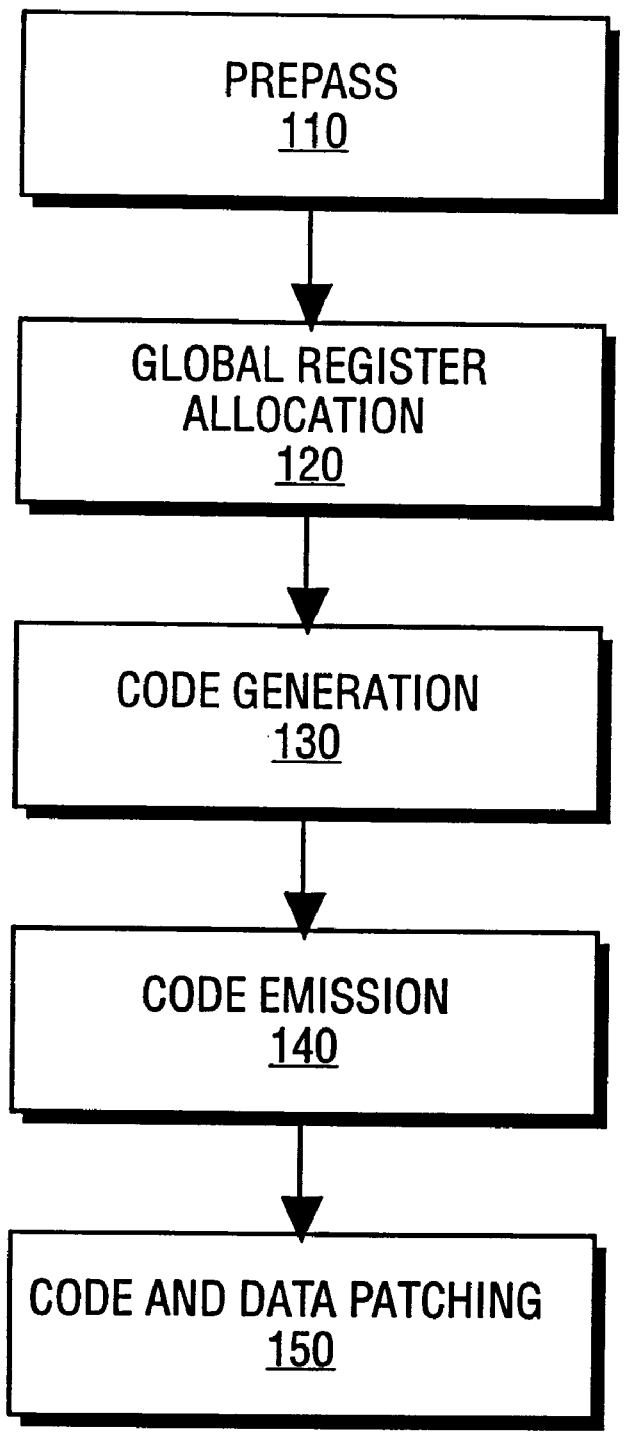
FIG. 1 is a flow chart illustrating the major phases of one embodiment of a Java "Just-In-Time" compiler.

A method for eliminating common subexpressions from Java byte codes is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Java object-oriented programming language. Although the following embodiments are described with reference to the Java programming language and Java "Just-In-Time" (JIT) compilers, other embodiments are applicable to other types of programming languages that use compilers. The same techniques and teaching of the present invention can easily be applied to other types of compiled object code.

An intended advantage of one of more embodiments described below is the tailoring of the common subexpression elimination algorithm to byte codes. Another intended advantage is the lightweight aspect of the invention in terms of both execution time and auxiliary data structures. Other intended advantages of one or more embodiments may include speed and efficiency.

The Java programming language introduces new challenges to the compiler writer because of the "Just-In-Time" (JIT) nature of the compilation model. A static compiler converts Java source code in a verifiably secure and compact architecture-neural intermediate format called Java bytecodes. A Java Virtual Machine (VM) later interprets the bytecode instructions a runtime. In order to improve runtime performance, a JIT compiler may convert bytecodes into native code at runtime. Although offline compilation of bytecodes into native code is possible, it cannot always be performed because not all of the necessary Java class files are guaranteed to be available at the start of program execution. Therefore, a bytecode compiler needs to be prepared to execute dynamically at runtime; hence the "JIT compiler."

As such, compilation speed becomes much more important in a Java JIT compiler than in a traditional compiler. While the traditional methodology of compiler performance measurement would ignore compilation time, performance measurements of JIT compilers must include the compilation time since the JIT compilation is included in the overall program execution time. As a result, it is extremely important for the JIT compiler organizations to be lightweight and effective. Therefore, a lightweight implementation of JIT compiler optimization such as common subexpression elimination would be desirable.

The present invention introduces a new common subexpression elimination (CSE) method. Traditional common subexpression elimination algorithms, which are based on data flow analysis and value numbering, are expensive in both time and space. Hence, such complex techniques should be avoided in JIT compiler implementations. The fast, lightweight CSE method of the present invention uses Java bytecodes as a compact representation of expressions to eliminate common subexpressions and focuses on common subexpressions within extended basic blocks. A basic block is defined as a control-flow region with a single entry point and any number of exits. The method of the present invention is not only time linear, but its memory requirements are also small. The present invention method requires memory for the bytecodes and a constant amount of memory proportional to the number of physical machine registers on the target machine.

Consider the expression "x+y". Assuming "x" and "y" are local variables 1 and 2, respectively, the expression's instruction sequence is [iload__1, iload__2, iadd]. Because the bytecodes of the "iload__1", "iload__2", and "iadd" instructions are "0x1b", "00x1c", and "0x60", respectively, the value "0x1b1c60" represents the expression "x+y". Hence, when the value 0x1b1c60 appears as a subsequence in the bytecode instruction stream, the expression "x+y" can be represented with an expression tag. An expression tag comprises of a <offset,length> pair. The offset or index is the distance of the start of the current expression from the beginning of the byte code stream. In one embodiment, the maximum size of the code stream is $2^{16}$. Therefore, an expression tag can be represented concisely using a single double-word (dword) (16 bits for the offset and 16 bits for the length). So in order to detect whether the expressions represented by tags <offset1,n> and <offset2,n> represent the same syntactic expression, a simple string compare the subsequences of length "n" starting at "offset1" and"offset2". The code selector tracks the expression values held in the scratch registers by annotating each scratch register R with the tag of the expression that R contains. Expression tags are initialized to hold no values at the beginning of basic blocks that have branch labels.

Before selecting code for a bytecode B, the code selector looks ahead in the stream to see whether the expression starting from B matches one already associated with a scratch register. In one embodiment, the registers are checked in decreasing order of subsequence length to match the largest sized expression first. Expression lengths are limited to 16 bytecodes so that the compilation time remains linear. If a code sequence matches a known expression stored in a register, then the code selector pushes the register contents onto the stack and skips over the common subexpression in the bytecode stream. But if a match is not found, the code selector selects an instruction sequence for bytecode B and updates the expression tag of the register containing the result of this instruction sequence.

An expression is only valid for a limited period of time. There are two ways that the availability of an expression E held in a register R is killed. (1). By instructions that modify the value of the register R that contains the computed expression E. If register R is a caller-saved register, then a call site kills the availability of E in R. In this case, the expression tag of R is updated to indicate that the R contains no value. The availability of E in R is also killed when the register manager allocates R for reuse by the code selector. Here, the code selector updates the expression tag of T to indicate that it contains a new expression or no value if R was used to hold a temporary value. (2). By assignments or method calls that potentially modify a source value is part of expression E. Expression E may have variables, array elements, and object fields as source operands. Any of which can be modified by method calls or assignments. At a method call, the code selector would kill the availability of all expressions that contain loads of array elements or object fields. During an assignment, the code selector kills the availability of all expressions that load or may load the assigned variable, object field, or array element. Hence an expression value is discarded when variables used in the corresponding expression are modified. An expression value is also discarded when any array element in an array containing an a value used by the expression is modified.

In the one embodiment, the information about the set of variables and object fields used by an expression is held in kill sets. One kill set is associated with each register managed by the register manager. Each variable has a unique index and each object field has a unique constant pool index. This allows a kill set to be maintained as a bit vector with the first few bits dedicated to variable indices and the rest of the bits dedicated to object field indices. Whenever an object field assignment bytecode (i.e., a putfield bytecode) assigns a new value to an object field with index I, the code selector kills the availability of a register R if the I'th object field index is set in R's kill set bit vector. The code selector performs similar bookkeeping for assignments to variables. One way of saving memory space and compilation time is to limit the size of each kill set bit vector to 256 bits.

The code selector may take more conservative approach to killing expressions that load array elements. Rather than performing expensive alias analysis, the JIT in the preferred embodiment takes advantage of the Java feature that there is no aliasing between arrays with different element types. Each register R has a fixed-size bit vector that contains the set of array element types loaded by the expression held in R. When the code selector encounters an assignment to an array element of type T, it kills all registers containing expressions that load array elements of type T. The code selector uses this bit vector in conjunction with an additional bit flag that indicates whether an expression has any object field references to detector expressions that are killed by method calls.

Phases of a Java JIT Compiler

Referring now to FIG. 1, there is a flow chart illustrating the major phases of one embodiment of a Java "Just-In-Time" compiler. FIG. 1 shows the five major phases of a Java JIT as in one embodiment. The prepass phase 110 performs a linear-time traversal of the bytecodes to collect information needed for the global register allocation and for implementing garbage collection support. The global register allocation phase 120 assigns physical registers to local variables. The code generation phase 130 generates native processor instructions and performs optimizations including common subexpression elimination. The code emission phase 140 copies the generated code and data sections to their final locations in a memory. The code and data patching phase 150 fixes up relocations in the emitted code and data sections; for instance, offsets of forward branches, addresses of code labels in switch table entries, and the address of switch tables in the read-only data section. With the exception of the global register allocation phase 110, all phases are linear in time and space.

Running a Java Class File

Figure 2:
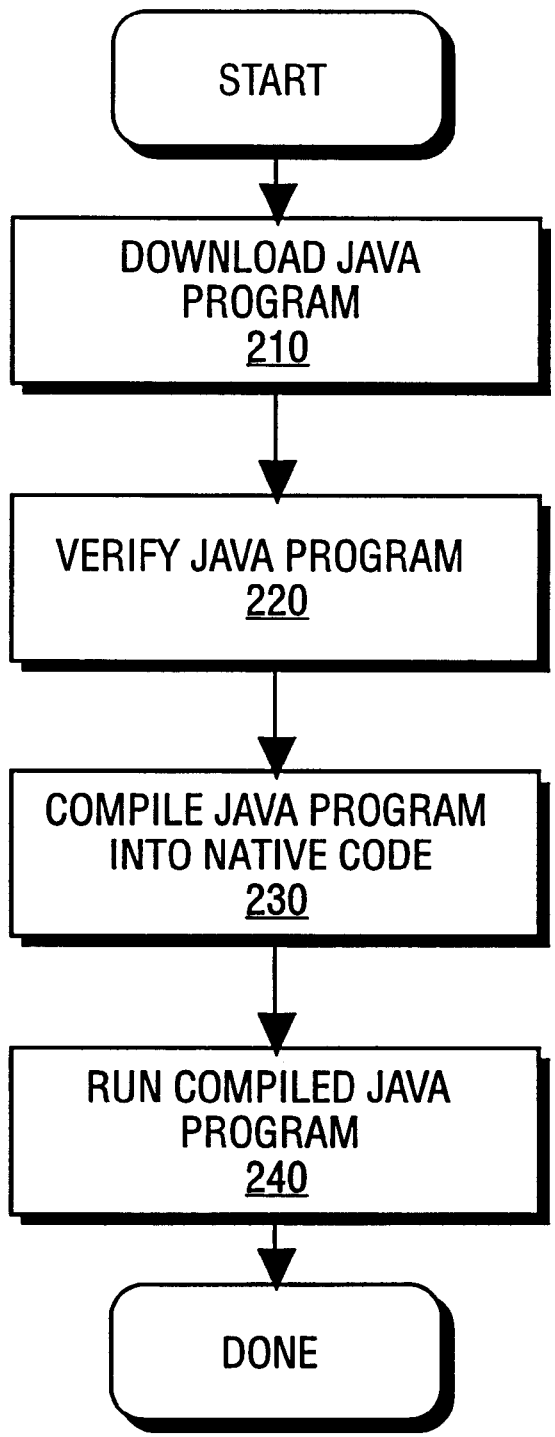
FIG. 2 illustrates the steps of downloading, compiling, and running a Java program in a Java Virtual Machine that compiles the code before execution.
Figure 3:
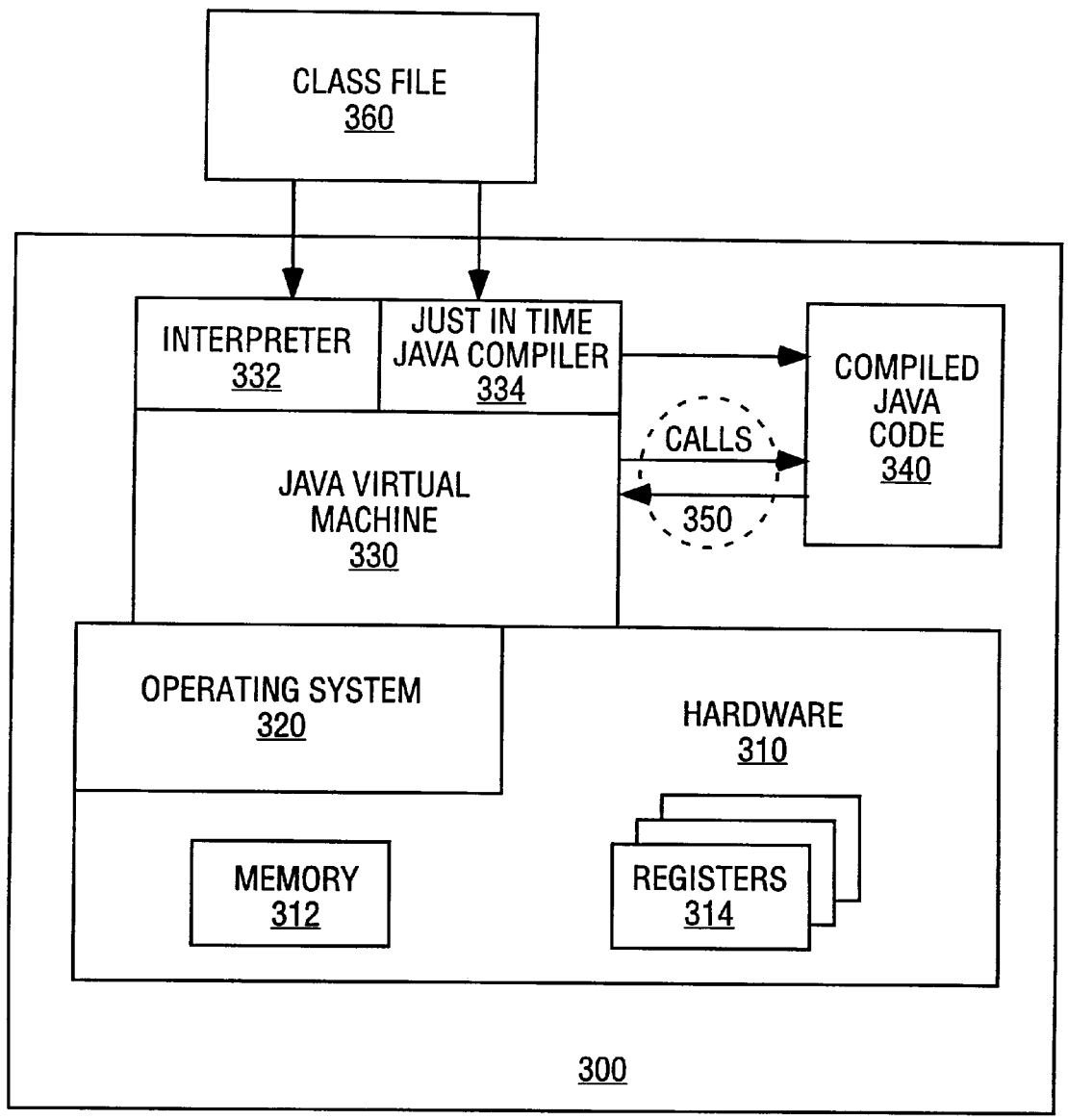
FIG. 3 illustrates a block digram of a Java Virtual Machine on a client computer system.

An example of running a Java program in a networked computer environment is provided with reference to FIG. 2 and FIG. 3. FIG. 2 illustrated the steps of downloading, compiling, and running a Java program in a Java Virtual Machine that compiles the code before execution. FIG. 3 illustrates a block diagram of the elements in a client computer system 300 equipped with a Java Virtual Machine to interpret and compile Java class files. The client computer system 300 includes computer hardware 310 controlled by an operating system 320. The computer hardware further comprises of computer memory 312 and machine registers 314. The system 300 also includes a Java Virtual implementation 330 for running Java class files 360. In the present embodiment, the Java Virtual Machine 330 running on the client computer system 300 relies on services from the underlying operating system 320 and the computer hardware 310. Furthermore, the Java Virtual Machine 330 may utilize a Java Interpreter 332 for interpreting Java class files 360 or a Java "Just-In-Time" (JIT) computer 334 to generate compiled Java code.

In a networked environment, a user would first access a computer server through the network and download the desired Java class file 360 into a client computer system 300 as in step 210. After the class file 360 has been downloaded, the Java Virtual Machine 330 verifies the class file at step 220. Step 220 of verifying the class file is to ensure that the program will not cause security violations not will it cause harm to the computer system resources. After the Java program has been verified, a Java JIT compiler 334 compiles the Java class file and generates compiled Java code 340 in the form of native processor code at step 230. Then this compiled Java code 340 is directly executed on the computer hardware 310 at step 340. Java programs which have been compiled and translated into the native code of the processor in the client system 300 execute much faster than Java programs that executed using a Java interpreter. In order to maintain the state of the Java Virtual Machine 300 and make system calls, the compiled Java code 340 makes calls 350 into the Java Virtual Machine 330.

Although the above example describes the distribution of a Java class file via a network, Java programs may be distributed by way of other computer readable mediums. For instance, a computer program may be distributed through a computer readable medium such as a floppy disk, a CD ROM, a carrier wave, or even a transmission over the internet.

Eliminating Common Subexpressions

Figure 4:
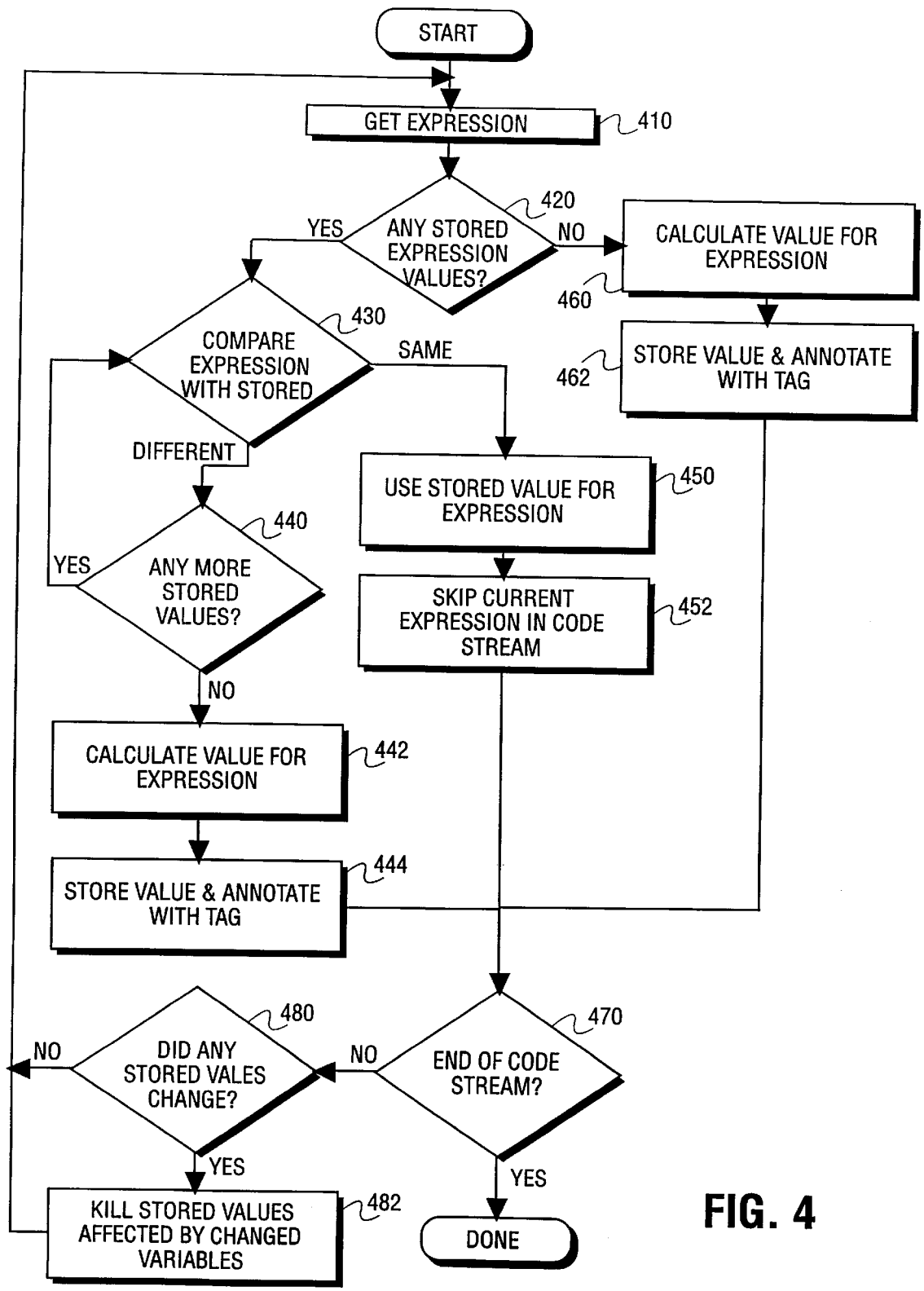
FIG. 4 is a flow chart representing the steps comprising one embodiment of the present invention.

FIG. 4 is illustrates a flow diagram of the common subexpression elimination method of the present invention during the code generation process. Initially, at step 410, code selector takes a bytecode or expression from the code stream. Before selecting code for the bytecode, the selector looks ahead in the stream to see whether the expression starting at this bytecode matches one already associated with a scratch register. First, the compiler checks to see if any expressions are stored in the registers at step 420. If no stored expressions are available, the code selector selects an instruction sequence for the bytecode at step 460. Then the expression value is stored in a register at step 462 and the expression tag of the register containing the result of the instruction sequence is updated. The code selector reaches step 470 and checks to see if the end of the code stream has been reached. If it has not, then the code selector goes back to step 410 for the next bytecode. In the present embodiment, the code selector performs step 480 between the process of the code selector looping from step 470 to step 410. Step 480 checks to see if any of the stored values have changed in value. In other words, the check is to see if the availability of any stored expression are now invalid. Stored expression may become invalid when (1) instructions modify the value of the register R that contains the computed expression E, or (2) assignments or method calls modify a source value that is part of expression E. If the code selector discovers that a stored value has changed, then the affected stored value is killed at step 482. Killed in this sense means that the stored expression value is discarded. Then the code selector continues on back to step 410.

But if at step 420, the code selector finds that stored expression values are available in registers, the selector then compares the current expression with a stored expression at step 430. The registers are checked in decreasing order of subsequence length to match the largest sized expression. If the comparison fails and the code selector finds that not all the stored expressions have been compared at step 440, then the selector loops back to step 430 and compares the current bytecode with the next largest expression in the registers. If there are no more stored expressions at step 440, the code selector selects an instruction sequence for the bytecode at step 442. As before the expression value is stored in a register at step 444 and the expression tag of the register containing the result of the instruction sequence is updated.

Then the code selector reaches step 470 and checks to see if the end of the cod stream has been reached. If it has not, then the code selector loops back to the step 410 for the next bytecode.

If the expression comparison at step 430 indicates that the expression are syntactically identical, then the code selector pushes the contents of the register onto the stack at step 450. Then at step 452, the code selector skips over the common subexpression in the bytecode stream. Now the selector reaches step 470 as in the other paths described earlier. If the end of the code stream has not been reached, the code selector returns to step 410 for the next bytecode in the code stream. If the stream has ended, the phase is completed.

An Example

FIG. 5 shows the optimization of example source code by one embodiment of the present invention. The partial code stream in FIG. 5 is an example of that found in a Java program or applet. The entries in the first column 510 show Java bytecode sequences. Each bytecode is numbered with its index in the bytecode stream. The second column 520 shows the native code generated by a Java JIT compiler. This column 520 also shows the points at which the code selector generates instructions. For instance, the code selector generates the first native instruction when it encounters the third bytecode at line 587. The last three columns of the table (columns 530, 540, and 550) show the expression tags held in the scratch registers at each point during code selection. In this example, global register allocation has assigned the edp register to variable 0, while variables 5, 18, and 20 are in memory. Accesses to variables 5, 18, and 20 are based off the stack pointer (esp).

When the code selector generates the first native instruction (mov ecx,[edp+04h]) at line 587, it annotates register ecx with the expression tag <583,4> to indicate that the ecx register holds the value of the expression formed by the first two bytecodes 583 and 584. The code selector delays generating code for bytecodes 590 (getfield #44), 593 (lload 18), and 595 (l2i), until it encounters bytecode (596 (aaload). The values of bytecodes (l2i) 595 and (getfield #44) 590 are kept in registers ecx and eax, respectively. The expression tags of these registers are updated accordingly to <593,3> and <583,10>. As the value of bytecode 596 (aaload) is loaded into the edx register, the expression tags <583,10> of eax and <593,3> of ecx are combined to form the expression tag <583,14> of register edx.

When the code selector finishes generating code for byte code 601 (istore 5) and scans the next bytecode (aload__0 at index) 603, there are three expressions, <583,18>, <593,3> and <583,14> being held in the three scratch registers. The selector then attempts to match a CSE by searching the expression tags in the order of <583,18<, <583,14>, and <593,3>. Since the expression <603,14> matches <583,14>, a CSE has been detected. The code selector pushes the contents of register edx onto the stack. Then the selector skips bytecodes 603 to 616, and continues generating code from bytecode 617 (getfield #49).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative than a restrictive sense.

What is claimed is:

1. A computer implemented method of optimizing code comprising:

loading a code stream into computer memory, said code stream comprising of a set of sequences of code;

storing a first expression value for a first expression in a first memory location, said first expression comprising of a first sequence of code;

tracking said first expression value by annotating said first memory location with a tag of said first expression;

performing a string compare of a second sequence of code with said first sequence of source; and replacing a second expression with said first expression value, said second expression comprising a second sequence of code, if said second sequence of code matches said first sequence of code, and omitting execution of said second sequence of code in code stream.

2. The method of claim 1 further comprising storing a second expression value for said second sequence in a second memory location if said second sequence of code does not match said first sequence of code, and annotating said second memory location with a tag of said second expression.

3. The method of claim 1 wherein said replacing comprises pushing said first expression value onto a stack.

4. The method of claim 1 wherein said code comprises of Java byte codes.

5. The method of claim 1 wherein said memory location comprises of a processor register.

6. The method of claim 1 wherein said memory location comprises of a stack.

7. The method of claim 1 wherein said comparing comprises a string compare of code sub-sequences.

8. A method of eliminating common subexpressions during computer code generation comprising:

loading a code stream into computer memory, said code stream comprising of a set of sequences of code;

storing a first expression value for a first expression in a first memory location, said first expression comprising of a first sequence of code;

performing a string compare of a second expression with said first expression, said second expression comprising of a second sequence of code; and using said first expression value for said second expression if said second expression matches said first expression, and skipping over said second sequence of code in said code stream.

9. The method of claim 8 further comprising tracking said first expression value by annotating said first memory location with a tag of said first expression.

10. The method as claimed in claim 8 further comprising storing a second expression value for said second sequence in a second memory location if said second expression does not match said first expression, and annotating said second memory location with a tag of said second expression.

11. The method of claim 8 wherein said using said first expression value comprises pushing said first expression value onto a stack if said second expression matches said first expression, and skipping over said second sequence of source code in code stream.

12. The method of claim 9 further comprising storing a second expression comprising of said second sequence in a second memory location if said second sequence of code does not match said tag of first expression, and annotating said second memory location with a tag of said second expression.

13. The method as claimed in claim 9 wherein said using said first expression value comprises pushing said first expression value onto a stack if said second sequence of code matches code sequence annotated by said tag of said first expression, and skipping over said second sequence of code in code stream.

14. The method of claim 8 wherein said code comprises of Java byte codes.

15. The method of claim 8 wherein said memory location comprises of a processor register.

16. The method of claim 8 wherein said memory location comprises of a stack.

17. A computer readable medium having embodied thereon a computer program, the computer program being executable by a machine to perform a method comprising:

loading a code stream into computer memory, said code stream comprising of a set of sequences of code;

storing a first expression value for a first expression in a first memory location, said first expression comprising of a first sequence of code;

tracking said first expression value by annotating said first memory location with a tag of said first expression; and performing a string compare of a second expression with said first expression, said second expression comprising of a second sequence of code.

18. The computer readable medium having embodied thereon a computer program of claim 17, the computer program being executable by a machine to further perform:

replacing an expression value for said second expression with said first expression value if said second expression matches said first expression, and skipping over said second sequence of code in said code stream; and storing a second expression value for said second expression in a second memory location if said second expression does not match said first expression, and annotating said second memory location with a tag of said second expression.

19. The computer readable medium having embodied thereon a computer program of claim 17, the computer program being executable by a machine to further perform:

replacing an expression value for said second sequence with said first expression value if said second sequence of code matches said first sequence of source code, and skipping over said second sequence of code in said code stream; and storing a second expression value for said second sequence in a second memory location if said second sequence of code does not match said first sequence of code, and annotating said second memory location with a tag of said second expression.

20. The computer program of claim 17 wherein said code comprises of Java byte codes.

21. A digital processing system having a processor operable to perform the steps of:

loading a code stream into computer memory, said code stream comprising of a set of sequences of code;

storing a first expression value for a first expression in a first memory location, said first expression comprising of a first sequence of code;

tracking said first expression value by annotating said first memory location with a tag of said first expression; and performing a string compare a second expression with said first expression, said second expression comprising of a second sequence of code.

22. The digital processing system of claim 21 operable to further perform the steps:

pushing said first expression value onto a stack if said second expression matches said first expression, and skipping over said second sequence of code in said code stream; and storing a second expression value for said second expression in a second memory location if said second expression does not match said first expression, and annotating said second memory location with a tag of said second expression.

23. The digital processing system of claim 21 operable to further perform the steps:

pushing said first expression value onto a stack if said second sequence code matches said first sequence of code, and skipping over said second sequence of code in said code stream; and storing a second expression value for said second sequence in a second memory location if said second sequence of code does not match said first sequence of code, and annotating said second memory location with a tag of said second expression.

24. The digital processing system of claim 21 wherein said code comprises of Java byte codes.

25. A method of eliminating common subexpressions comprising:

loading a set of bytecode sequences into computer memory;

generating a first expression value for a first bytecode sequence;

storing said first expression value in a first memory location;

tracking said first expression value by annotating said first memory location with a tag of said first bytecode sequence;

performing a string compare of a second bytecode sequence with said first bytecode sequence; and replacing said second bytecode sequence with said first expression value if said second bytecode sequence matches said first bytecode sequence.

26. The method of claim 25 further comprising:

generating a second expression value for said second bytecode sequence if said second bytecode sequence does not match said first bytecode sequence;

storing said second expression value in a second memory location; and annotating said second memory location with a tag of said second bytecode sequence.

27. The method of claim 25 wherein said replacing comprises pushing said first expression value onto a stack and marking said first expression value as equivalent to a result of said second bytecode sequence.

28. The method of claim 25 wherein said memory location comprises of a register.

29. The method of claim 25 wherein said memory location comprises of a stack.

* * * * *